United States Patent
Li et al.

(10) Patent No.: US 10,315,274 B2
(45) Date of Patent: *Jun. 11, 2019

(54) LASER MARKING METHOD AND SYSTEM AND LASER MARKED OBJECT

(71) Applicant: nLIGHT Inc., Vancouver, WA (US)

(72) Inventors: Xiaojun Li, Shanghai (CN); R. Kirk Price, Seattle, WA (US); Jason N. Farmer, Vancouver, WA (US); Ethan A. McGrath, Portland, OR (US)

(73) Assignee: nLIGHT, Inc., Vancouver, WA (US)

( * ) Notice: Subject to any disclaimer, the term of this patent is extended or adjusted under 35 U.S.C. 154(b) by 494 days.

This patent is subject to a terminal disclaimer.

(21) Appl. No.: 15/040,357

(22) Filed: Feb. 10, 2016

(65) Prior Publication Data

US 2016/0263701 A1 Sep. 15, 2016

Related U.S. Application Data

(63) Continuation of application No. 13/236,949, filed on Sep. 20, 2011, now Pat. No. 9,290,008.

(51) Int. Cl.
*B23K 26/18* (2006.01)
*B41J 2/44* (2006.01)
(Continued)

(52) U.S. Cl.
CPC .......... *B23K 26/18* (2013.01); *B23K 26/0622* (2015.10); *B23K 26/082* (2015.10);
(Continued)

(58) Field of Classification Search
CPC ............. B23K 26/18; Y10T 428/24802; Y10T 428/24917
See application file for complete search history.

(56) References Cited

U.S. PATENT DOCUMENTS 5,632,916 A 5/1997 Lappalainen
5,817,243 A 10/1998 Shaffer
(Continued)

FOREIGN PATENT DOCUMENTS

CN 1868362 11/2006
CN 101414726 4/2009
(Continued)

OTHER PUBLICATIONS

Final Office Action for related U.S. Appl. No. 13/236,949, dated Aug. 5, 2015, 14 pages.
(Continued)

*Primary Examiner* — Gerard Higgins
(74) *Attorney, Agent, or Firm* — Klarquist Sparkman, LLP

(57) ABSTRACT

A laser marking method and system, and laser marked object are disclosed. The method includes directing a pulsed laser beam towards an object such that an interface between an oxidized layer and non-oxidized substrate is in a mark zone of the pulsed laser beam, and scanning the pulsed laser beam across the object in a predetermined pattern to create a mark having an L value of less than 40 and a surface roughness that is substantially unchanged compared to adjacent unmarked areas. The system includes a fiber laser generating amplified pulses that are directed towards a galvo-scanner and focusing optic, while the object includes an oxidized surface layer, an underlying non-oxidized substrate, and a mark having an L value of less than 40 with substantially unchanged roughness features.

19 Claims, 4 Drawing Sheets

(51) Int. Cl.
  *B41M 5/26* (2006.01)
  *B23K 26/356* (2014.01)
  *B23K 26/359* (2014.01)
  *B23K 26/0622* (2014.01)
  *B23K 26/082* (2014.01)
  *B41J 2/47* (2006.01)

(52) U.S. Cl.
  CPC .......... *B23K 26/356* (2015.10); *B23K 26/359* (2015.10); *B41J 2/442* (2013.01); *B41J 2/471* (2013.01); *B41M 5/262* (2013.01); *Y10T 428/24802* (2015.01); *Y10T 428/24917* (2015.01)

(56) References Cited

U.S. PATENT DOCUMENTS

| | | |
|---|---|---|
| 5,932,119 A | 8/1999 | Kaplan et al. |
| 6,275,250 B1 | 8/2001 | Sanders et al. |
| 6,590,183 B1 | 7/2003 | Yeo |
| 6,738,396 B2 | 5/2004 | Filgas et al. |
| 6,777,098 B2 | 8/2004 | Yeo |
| 7,656,578 B2 | 2/2010 | Galvanauskas et al. |
| 8,309,885 B2 | 11/2012 | Peng et al. |
| 9,290,008 B1 | 3/2016 | Li et al. |
| 9,837,784 B2 | 12/2017 | Lowder et al. |
| 2001/0030002 A1 | 10/2001 | Zheng et al. |
| 2004/0095655 A1 | 5/2004 | Owen |
| 2006/0065640 A1 | 3/2006 | Lizotte et al. |
| 2006/0196858 A1 | 9/2006 | Barron et al. |
| 2007/0240325 A1 | 10/2007 | Pelsue et al. |
| 2007/0258149 A1 | 11/2007 | Gardner et al. |
| 2009/0016388 A1 | 1/2009 | Gu et al. |
| 2009/0046746 A1 | 2/2009 | Munroe et al. |
| 2009/0225794 A1 | 9/2009 | Liu |
| 2010/0183040 A1 | 7/2010 | Ishizu et al. |
| 2011/0089067 A1 | 4/2011 | Scott et al. |
| 2011/0193928 A1 | 8/2011 | Zhang |
| 2011/0194574 A1 | 8/2011 | Zhang et al. |
| 2011/0315667 A1 | 12/2011 | Reichenbach |
| 2014/0268310 A1 | 9/2014 | Ye et al. |
| 2014/0300951 A1 | 10/2014 | Messerly |
| 2016/0197451 A1 | 7/2016 | Kraemer |

FOREIGN PATENT DOCUMENTS

| | | |
|---|---|---|
| CN | 102159406 | 8/2011 |
| CN | 102325626 | 1/2012 |
| CN | 102496842 | 6/2012 |
| CN | 102905839 | 1/2013 |
| CN | 103414102 | 11/2013 |
| WO | WO 2006/093378 | 9/2006 |
| WO | WO 2012/121732 | 9/2012 |
| WO | WO 2012/121733 | 9/2012 |
| WO | WO 2015/116849 | 8/2015 |

OTHER PUBLICATIONS

Ng et al., "Aesthetic laser marking assessment using luminance ratios," *Optics and Lasers in Engineering*, 35:177-186 (Mar. 2001).

Notice of Allowance for related U.S. Appl. No. 13/236,949, dated Nov. 10, 2015, 9 pages.

Office Action for related U.S. Appl. No. 13/236,949, dated Nov. 20, 2014, 12 pages.

Saklakoglu et al., "Investigation of micro-milling processes parameters for surface roughness and milling depth," *The International Journal of Advanced Manufacturing Technology*, 54(5-8):567-578 (May 2011).

Deladurantaye et al., "Material micromachining using bursts of high repetition rate picosecond pulses from a fiber laser source," Proc. of SPIE, 7914:791404-1-791404-01 (Jan. 2011) (downloaded Sep. 18, 2013).

First Office Action for related CN Application No. 201611234328.5, dated Apr. 18, 2018, 10 pages (w/ Eng. translation).

First Office Action for related CN Application No. 201710000835.0, dated Aug. 2, 2018, 10 pages (w/ Eng. translation).

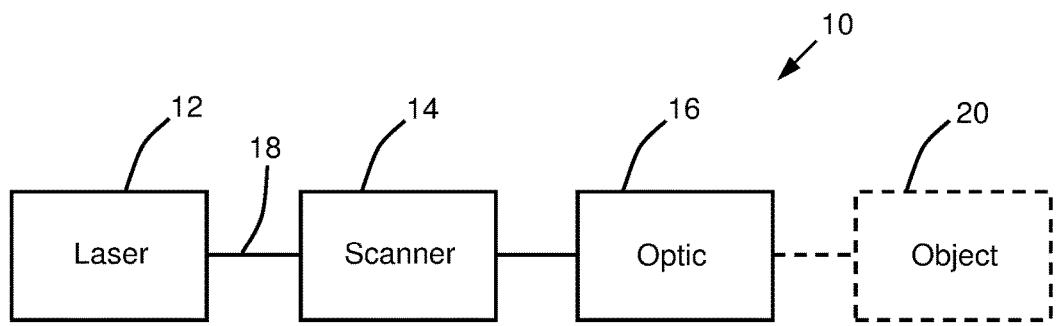
FIG. 1
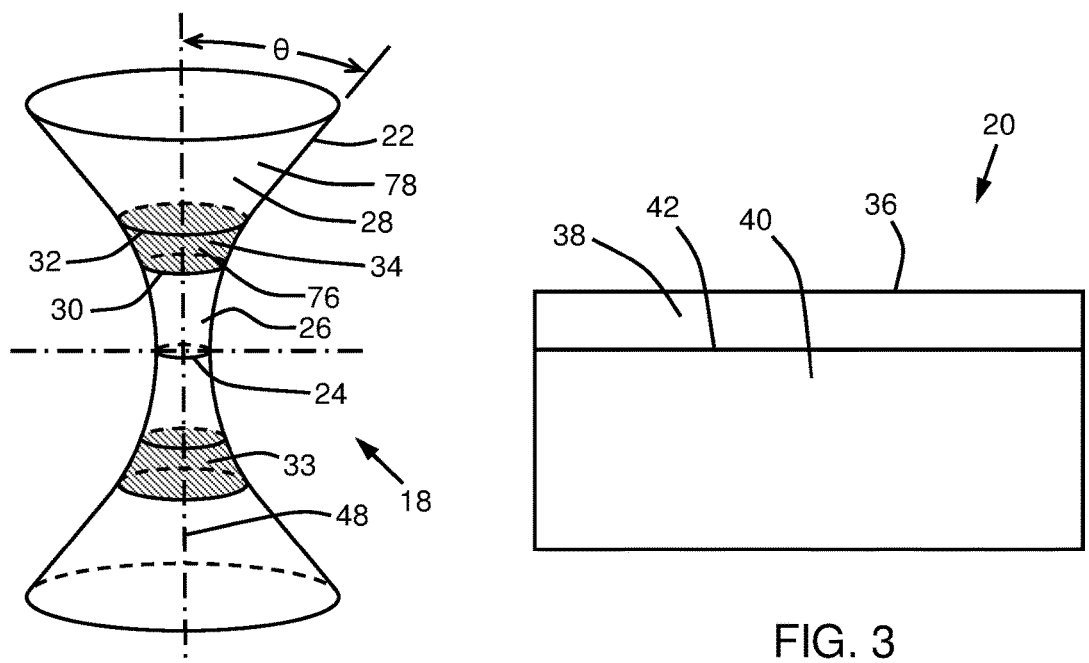
FIG. 2
FIG. 3

LASER MARKING METHOD AND SYSTEM AND LASER MARKED OBJECT

CROSS-REFERENCE TO RELATED APPLICATIONS

This application is a continuation of U.S. patent application Ser. No. 13/236,949, entitled "LASER MARKING METHOD AND SYSTEM" and filed Sep. 20, 2011, which is incorporated herein by reference.

BACKGROUND OF THE INVENTION

1. Field of the Invention

Generally, the field of the present invention is the marking of objects. More particularly, the present invention relates to a laser marking method and system and laser marked object.

2. Background

Objects have been marked with indicia since the dawn of civilization. Some of the earliest human rock carvings date back 12,000 years. Such petroglyphs were created by removing a portion of a rock surface to expose the underlying material. In some glyphs, significant contrast between the carved portion and the host rock was created by the removal of a shallow outer layer have different properties than the inner layers. Even as an oxide forms at the exposed section, the difference between the two materials causes the contrast to be retained over extended periods of time. However, in general glyphs in drier climates and glyphs on walls that were not otherwise exposed to weather effects were better suited to withstand many thousands of years of weather degradation. In the last few thousand years as innovation yielded dye technology and marking abilities associated therewith, pictographs emerged as a common alternative to petroglyphs. Again, drier climates and locations insulated from weather effects allowed some pictographs to remain intact to the present day.

In the last few centuries, advances in metallurgy and other material technology have expanded the set of markable objects to include pure metals and sophisticated alloys. Such objects are marked using traditional carving and marking methods and results tend to have several undesirable attributes. For example, mechanical carving methods tend to take a long time and are therefore cost prohibitive. Additionally, these methods can leave behind sharp shavings and edges that can injure a person interacting with the mark. Chemical marking does not fare much better as they frequently use toxic compounds to provide the permanence to the mark. And even then, the marks tend to wear away with repeated contact by a person or with repeat exposure to different elements.

More recently, the development of lasers and laser systems has provided an alternative to mechanical carving methods. Laser systems can be configured to provide quick and repeatable beam paths making them particularly suited for manufacturing. Consequently, lasers are now used to carve into the surface layers of materials to provide markings thereon. For example, a laser beam impinges on a metal surface and ablates away a shallow amount of material by locally superheating the portion of the object where the beam hits while leaving the bulk substrate unaffected. Unfortunately, the touch, appearance, and permanence aspects of such prior art markings are less than desirable, and the act of carving can cause long-term deleterious effects on the object itself by removing a protective oxidation layer, such as an anodization layer, or otherwise compromising the integrity of the material. Thus, there is a general need to have a marking process that can produce indelible marks that do not rub off after exposure to the elements and that do not themselves expose any underlying material to the elements.

In U.S. Pat. No. 6,590,183 a method is described for providing a mark in an aluminum element's surface by using a laser to penetrate an anodized outer layer in order to produce a mark substantially exclusively locally in a zone where the anodized layer adjoins the underlying aluminum substrate. To create such a mark, it is suggested that a laser be used having an operating wavelength of 1064 nm and a pulsed output of less than 20 ns such that material is locally melted and solidified. However, these procedures still fail to produce a mark that is very dark, smooth to the touch, and to do so very quickly. Thus, there remains a need for further innovation that will overcome these failings.

SUMMARY OF THE INVENTION

The present invention is directed to an innovation that overcomes the shortcomings of prior procedures by providing a superior and long-lasting sub-oxidized layer mark in an object using an enhanced process for making such a mark within a very short amount of time.

According to one aspect of the present invention, a laser marking process for producing high quality marks is provided. A pulsed laser beam operating at 10-1000 kHz and an average power of less than 20 W is directed to a target object for marking such that a sub-surface interface between an oxidized surface layer and underlying non-oxidized substrate of the target object is in a mark zone of the pulsed laser beam. The mark zone can be defined through identification of an ablation threshold and a mark threshold, and suitable tuning of laser parameters, including power, spot size, and scan rate. The pulsed laser beam and target object are scanned relative to each other in a predetermined pattern such that a mark is created below the surface of the object and into the underlying substrate.

According to another aspect of the present invention, a marked object is provided that includes an oxidized outer layer, non-oxidized underlying substrate, and an interface therebetween, wherein the object has a surface roughness substantially similar to adjacent unmarked regions and has a LAB standard for color characterization darkness value of less than 40 irrespective of viewing angle.

According to another aspect of the present invention, a laser system includes a laser source for providing a pulsed laser beam, a galvo-scanner for scanning the pulsed laser beam in a pre-determined pattern, and a focusing optic for focusing the pulsed laser beam to a mark zone, wherein the properties of the pulsed laser beam are sufficient to create a mark having a darkness value of less than 40 below the surface of a metallic target such that the surface roughness of the metallic target in the marked area is substantially unchanged.

The foregoing and other objects, features, and advantages will become more apparent from the following detailed description, which proceeds with reference to the accompanying figures.

BRIEF DESCRIPTION OF THE DRAWINGS

FIG. 1 is a block diagram of a laser system for marking objects in accordance with an aspect of the present invention.

FIG. 2 is a perspective view of a laser beam in accordance with an aspect of the present invention.

FIG. 3 is a side view of an object for marking by the laser system of FIG. 1.

DETAILED DESCRIPTION OF THE INVENTION

Figure 4:
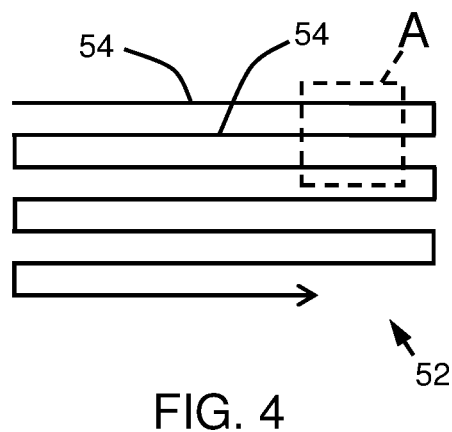
FIG. 4 is a plan view of a laser beam path taken on an object.

Referring to FIG. 1, a laser marking system 10 in accordance with the present invention is shown to include a laser 12, a scanner 14, and one or more optics 16 optically coupled to the scanner 14. A laser beam 18 is emitted from the laser 12 and propagates through the system 10 before becoming incident on a target object 20 which is preferably aluminum having an oxidized surface, such as anodization. Herein, "object" has a broad meaning to include various workpieces that are capable of being marked. The target objects are preferably metallic in nature, such as pure elemental metals, and alloys thereof. Additionally, metals with oxidized surfaces are preferred, such as anodized aluminum, whether rough or polished. Referring back to FIG. 1, the laser 12 has a pulsed output whereby laser light is generated only intermittently or otherwise allowed through an output only intermittently. A pulse of light transmitted through an output of the laser 12 has a characteristic shape of intensity with respect to time, and therefore has a characteristic peak intensity, peak power, pulse width, and pulse repetition rate. The beam also has spatial characteristics that are important, particularly in conjunction with the aforementioned intensity characteristics. As will be discussed hereinafter, the beam characteristics are important and must be selected and adjusted carefully to achieve the desired mark attributes. A careful balance between pulse energy, peak power, thermal crosstalk, and run time must be achieved such that superior marks can be obtained in as short a time as possible. This balance can also manifest as a careful harmonization of average power, peak power, and scan speed.

Laser 12 preferably operates such that it emits a diffraction limited laser beam 22 substantially in the fundamental mode. One such system includes a solid state gain medium emitting a seed signal, a fiber amplifier for amplifying the seed signal provided by the solid state medium, and diode sources for pumping the solid state medium and fiber amplifier. Such a system can generate 1 kW of peak power while having a pulse width of less than about 2 ns. In an alternative embodiment, a diode-pumped solid state laser is used having similar system peak power, pulse width, and peak intensity. The fiber amplifier can comprise one or more fiber amplifier stages for increasing the output power of the laser beam 22. In other embodiments, a mode-locked fiber laser is used having a pulse picker to control pulse repetition and multiple fiber amplifier stages for amplifying the pulse picked signal. Some embodiments utilize a diode-pumped microchip as a pulsed seed source.

FIG. 2 shows a section of a laser beam 22 propagating in the fundamental mode. On the top side of a beam waist 24, beam 22 has a lower portion 26 and an upper portion 28. Interposed between the upper and lower portions 26, 28 is a marking zone 34 bounded below by an ablation threshold plane 30 and above by a marking threshold plane 32, the threshold planes 30, 32 lying generally perpendicular to the propagation path 48 of the beam 22. As beam 22 propagates along path 48 downward from the top of FIG. 2, the spot size of beam 22 slowly decreases to a minimum at the waist 24. Because the waist radius $W_0$ is inversely related to the beam divergence θ, the characteristics of diffraction limited beam 22 can be adjusted to match the needs of the system or mark. For example, a very small waist 24 can be achieved only at the expense of substantial divergence. In a system with large divergence, the spot size can vary quickly and consequently the range of suitable focus positions, or Z positions, along the propagation path becomes more limited making system design more difficult.

Figure 5:
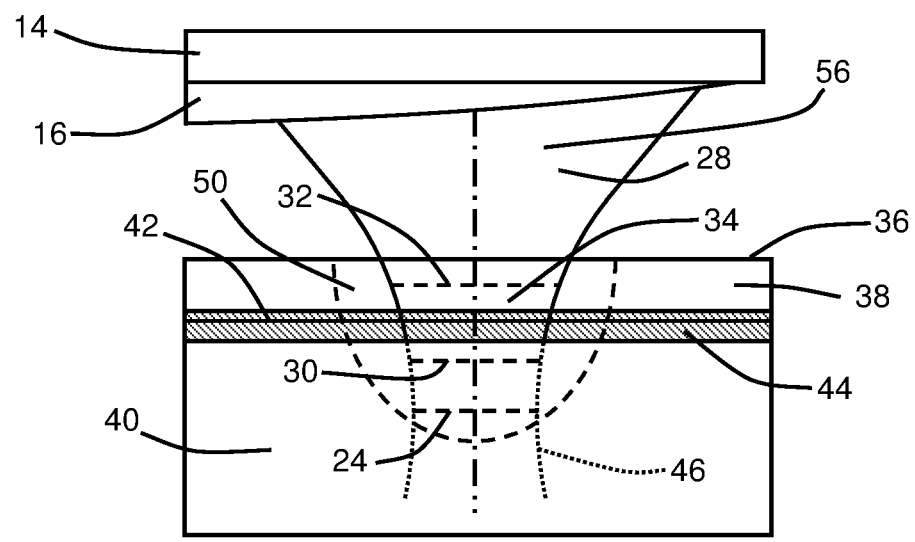
FIG. 5 is a side view of a portion of the laser system and object being marked thereby in accordance with an aspect of the present invention.

Referring to FIG. 3, a cross-section of an exemplary target object 20 is shown. Object 20 has a surface 36 and a non-oxidized underlying substrate 40. For anodized aluminum, object 20 will include an oxidized layer 38 as well as an interface 42 between the oxidized layer 38 and underlying non-oxidized layer 40. The addition of an oxidation layer 38, or anodization layer, has several benefits including corrosion resistance, enhanced surface hardness, and non-conductivity. Oxidized layer 38 is generally thin, being measurable in microns, and is typically formed according to various electrolytic methods that are known in the art. While illustrated with straight lines for convenience, surface 36 and interface 42 actually have considerable contour when under magnification, e.g., in FIG. 6. In FIG. 5, beam 22 from FIG. 2 is shown to be transmitted through a portion of focusing optic 16 and to be directed towards target object 20 of FIG. 3. Optic 16 causes a focusing of the beam 22 such that the waist 24 is disposed hypothetically below the interface 42 of the object 20. Also disposed hypothetically below the interface 42 are ablation threshold 30 and the continued beam shape 46.

Laser beam 18 has photons of a particular wavelength. The wavelength should be selected such that that the photons interact with the metallic material of object 20. For aluminum, a laser emitted wavelength near 1 micron, such as that generated by Neodymium or Ytterbium doped optical gain media, is suitable. Other wavelengths may be used, for example, frequency doubled 532 nm, as well as many others. Since the oxidized layer 38 is less electro-active than the underlying substrate 40, beam 22 can propagate through layer 38 without detrimentally interacting therewith. As shown in FIG. 5, the ablation and marking planes 30, 32 lie above the hypothetical beam waist 24 and are positioned such that interface layer 42 lies between the respective thresholds 30, 32. Under a similar laser system setup, a larger propagation distance may separate optic 16 and target object 20 such that waist 24 lies above interface layer 42, e.g., using opposite zone 33 shown in FIG. 2, thereby utilizing the symmetric shape of Gaussian beam 22. Thus, herein symmetric zone 33 may be substituted for mark zone 34.

It is also possible to select the beam parameters such that the waist 24 is coterminous with the ablation threshold 30 while the marking threshold 32 lies somewhat above the waist 24. To obtain a coterminous waist 24 and ablation threshold 30, typically the average power of the laser 12 is decreased while leaving other adjustable parameters, such as repetition rate, unchanged. As the average power decreases, so does the pulse energy and peak power. Accordingly, the ablation and marking thresholds 30, 32 gradually shift towards the waist 24. The marking zone 34 in such a configuration would include the waist 24 and extend up to marking threshold 32 thereabove.

Referring again to FIG. 5, pulses 56 penetrate the surface oxidized layer 38 and cause a dark marked portion 44 to be formed at the interface 42, below the interface 42 and into the substrate 40, and above the interface 42 in the oxidized layer 38. Using the methods and systems of the present invention, objects of the present invention can be marked so as to obtain mark LAB color characterization darkness levels, or "L" values, of less than 40. In some embodiments the L value achieved is 30 or less. Moreover, marked portion 44 tends to maintain substantially the same darkness level across many viewing angles, including shallow angles. For example, the L value may not change by more than 20% across viewing angles, though discerning whether the darkness value changes is more easily determined by simple visual observation. In some embodiments, even lower L values are achieved, such as L values less than 30 and even less than 25.

Figure 4A:
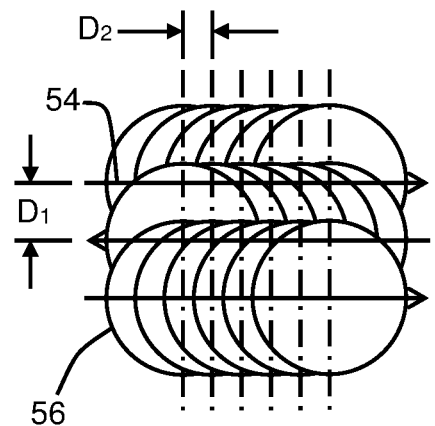
FIG. 4A is an expanded view of a portion of FIG. 4.

Referring now to FIG. 4, an exemplary scanning path 52 is shown depicting a typical path for pulsed laser beam 22 to scan across target object 20. The path 52 has a scan spacing distance $D_1$ between parallel path segments 54. As shown, path segments are bi-directional, i.e., each subsequent path segment 54 has an opposite direction. However, other paths are possible, such as uni-directional. In uni-directional scanning, the movement of the laser beam is in the same direction for each parallel segment. Because the laser beam is operating in a pulsed regime and scanning across object 20 at one or more scan speeds, a pattern of laser pulses impinges object 20. As shown more clearly in the sectional close-up of FIG. 4A, pulses 56 overlap one another both in the direction of the scanning path 52 as well as perpendicular thereto, i.e., across the scan spacing distance $D_1$ direction. Suitable scan spacing distances $D_1$ are typically around 20 µm or less, and it may be preferred for the distance to be significantly closer, such as between 5 and 10 µm, depending on the parameters of the laser system used. The overlap in the direction of scanning is dependent in part on the scanning speed along scanning path 52 and the repetition rate of the laser 12. The scanning speed divided by the repetition rate determines distance $D_2$ between successive pulses along the scanning path 52. The overlap in the direction of scanning is also dependent on the size and shape of the laser pulse 56. The overlap in the direction of scanning is typically 80% or more and it may be preferred for the overlap to be significantly higher, such as 95% or more, depending on the parameters of the laser system used. While FIG. 4A shows laser pulses 56 having a circular shape, other shapes fall within the scope of the invention. For example, in some embodiments laser pulses 56 may have an oval or other non-circular shape. In other embodiments, the intensity distribution of the laser pulse 56 is closer to uniform across the width of the pulse instead of having a Gaussian distribution. Such a uniform distribution can be achieved by using various means, including a top-hat type filter disposed in the path of the pulsed laser beam. In some embodiments the uniformity may occur across only one axis transverse to the beam propagation path 48 while in others uniformity occurs across two transverse spatial axes. In general the significantly spatial uniformity achieved by the filter can vary by about 20% of a particular intensity value and include even more deviation from that value near the edges.

As described earlier, the laser system 10 generally includes a scanning system for scanning the laser beam in two dimensions. A suitable scanner is of the galvo-type, which typically directs the input laser beam to motion controlled mirrors. The mirrors direct the laser beam 18 to an optic 16, such as an Fθ lens, which then directs the beam to the target object 20. While other lens may be used, an Fθ lens is preferred so that the laser beam 18 is projected substantially uniformly across the lateral dimensions of the scanning area. As shown in FIG. 5, upper portion 28 of laser beam 18 projects nearer a side of the optic 16 and emerges with a Gaussian shape. In other configurations, the object 20 is translated in a predetermined pattern with respect to a fixed beam 18. In such configurations, a less expensive lens may be used since the beam 18 is not scanned.

Figure 8:
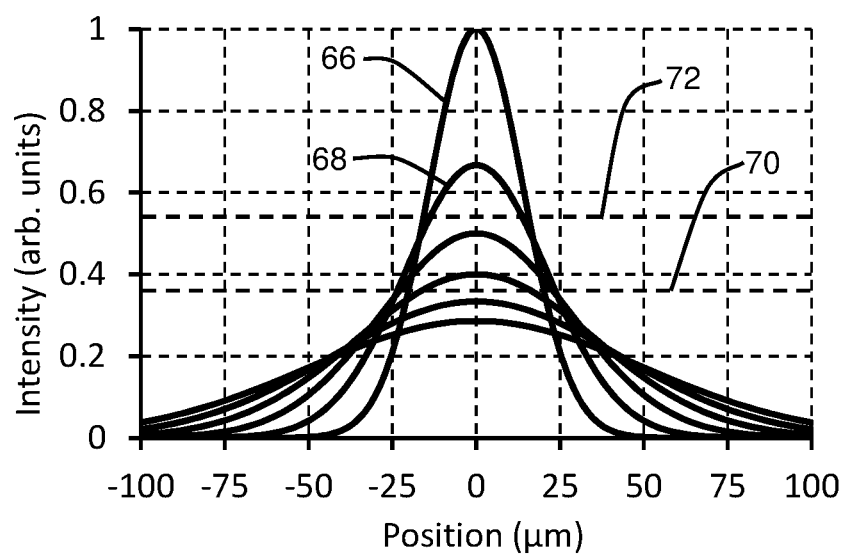
FIG. 8 is a chart of Gaussian intensity distributions with respect to spot position.

FIG. 8 shows several Gaussian distributions with differing spreads and normalized to unity, such as larger intensity distribution 66 and smaller intensity distribution 68. The increase in spread and concomitant decrease in peak intensity is representative of beam defocusing. For Gaussian distributions, several factors must be weighed to achieve optimum conditions for marking. One factor that must be weighed carefully is the peak power of the laser beam 18. As the peak power of a pulse increases for the same spot size, due to, for example, larger pulse amplification in an amplifier section of the laser system 10, the peak intensity similarly increases as well. The peak power is also strongly related to ablation level of the material being irradiated. Keeping other factors constant, such as repetition rate and pulse width, doubling pulse energy will result in a doubling of peak intensity. When directed at a target object, pulses 56 having doubled intensity will ablate away or damage the oxidized surface and underlying material. Example ablation and marking thresholds 70, 72 show regions within which peak intensity must be kept to prevent ablation and to provide a superior mark.

One way to mitigate the increased intensity of higher peak power is to defocus the pulsed laser beam 18. Again, referring to FIG. 8, a decrease in peak power and peak intensity can be achieved while spreading out the shape of the beam 18 laterally to mark a larger area. However, as the peak intensity increases by increasing the pulse energy, a larger amount of energy is introduced into the vicinity of pulse target. More energy per pulse produces a larger heat affected zone 50, an example of which being depicted in cross-section in FIG. 5, and can introduce additional undesirable effects on the target object 20. For example, often the oxidized layer 38 and the underlying material 40 have differing coefficients of thermal expansion. This variation can enhance cracking, surface changes, and angular color variation in the marked area 62, all caused by the pulsed beam 18. As pulse energy increases, the negative effects introduced by the coefficient of thermal expansion mismatch become enhanced. Consequently, thermal communication between pulses and scan path segments 54 is another factor to consider for making superior marks according to some aspects of the present invention.

As a laser pulse 56 impacts the target object, energy is transferred and a localized zone 50 of heat is created. The heat rapidly conducts into the surrounding material of the object 20. Each successive pulse 56 in the scanning path 54 produces another adjacent heat zone 50. As was described earlier, the scan speed and the repetition rate determine in part the overlap of each successive pulse 56 in the propagation path 54. When the scan speed increases while the repetition rate remains fixed, the pulse overlap decreases. Similarly when the repetition rate decreases but the scan speed remains fixed, the pulse overlap also decreases. Once the overlap reaches a critical separation distance with respect to the pulse energy and spot size, the transient temperature profile mismatch between the adjacent pulse zone 50 together with thermal expansion coefficient mismatch can result in ablation and damage effects. Similarly, when the distance $D_1$ between adjacent scan paths increases to a critical separation distance ablation effects occur. Consequently, minimum adjacent scan path separation and pulse overlap produce marks with superior appearance and unaltered tactile feel.

Figure 6:
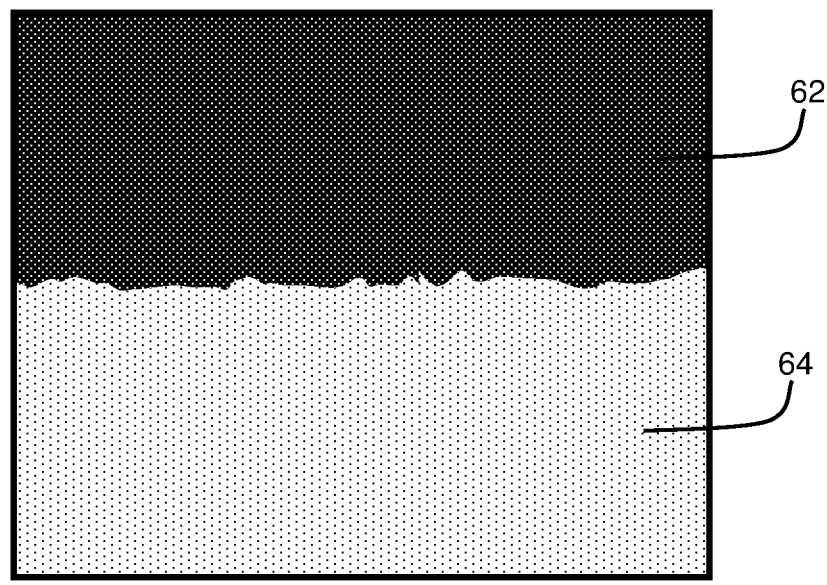
FIG. 6 is a depiction of an exemplary object of the present invention showing marked and unmarked areas in accordance with an aspect of the present invention.

In FIG. 6, a depiction of a magnified surface image of an exemplary object 20 is shown. A marked area 62 contrasts with a neighboring unmarked area 64 at a micrometer scale. In some embodiments the surface topology includes bumps and dimples producing a characteristic roughness while in other embodiments the surface topology is very smooth, for example, with a polished surface. Notably in the embodiment illustrated in FIG. 6, the surface topology remains substantially similar between the marked and unmarked areas 62, 64. In other embodiments, the substantial similarity in surface roughness between marked and unmarked areas 62, 64 can be confirmed by tactile observation using fingertips, fingernails, small objects, or conventional instruments such as a profilometer or 3D imaging microscope.

It is observed that a single pass of pulses is generally insufficient to create a high quality mark that is very dark and visually consistent at different angles. Multiple passes of the beam over the same mark area allows successive pulses 56 to continue material processes in and beneath the oxidized layer 38 and into the underlying substrate 40 in order to maximize the darkness of the marked area 62. Moreover, to achieve the desired darkness in a single-pass requires more intensity which can cause damage to the oxidation and which can change the surface roughness features in the marking area. However, multiple passes can also have detrimental effects on the marked area 62. For a particular set of beam parameters, an excessive number of beam passes in the mark zone 34 can cause material degradation in the mark area 62. Consequently, in some embodiments, the boundaries of mark zone 34 are adjusted to account for such detrimental effects. One way to optimize the mark zone defining parameters, including marking and ablation thresholds and laser process parameters, including how quickly a mark is created, is by performing a multivariate statistical analysis, such as through a design of experiments.

Figure 7:
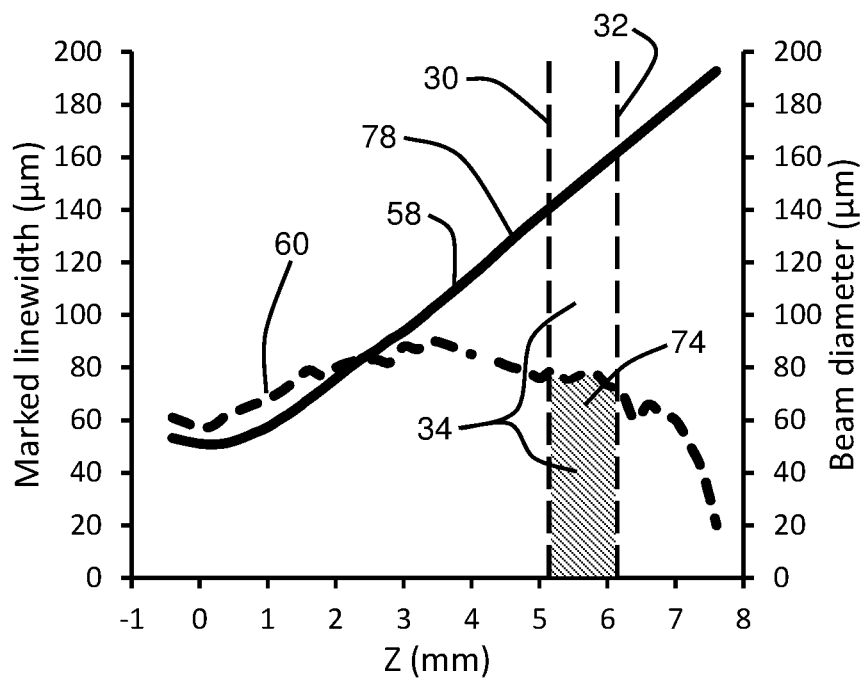
FIG. 7 is a chart of marked linewidth and beam diameter with respect to Z position of the laser system in accordance with an aspect of the present invention.

As was described earlier in relation to FIGS. 2 and 5, laser pulses 56 from beam 18 are configured to impinge the interface 42 in marking zone 34 to create a marked area 62. While the spatial relation between the beam 18 and target object 20 in the mark zone 34 provides a beam 18 having a particular width varying consistently as a function of Z position, the width of the area marked for a particular set of laser and beam parameters is a separate function of Z position or beam width. Referring to FIG. 7, a chart compares the beam width 58 and the marked width 60 on object 20 with respect to Z position for a cross-section of beam 18 for a particular set of laser system parameters. The marked linewidth 60 is about the same as the spot width 58 at the waist (Z=0) but gradually decreases, crossing the laser spot width 58, and begins to decrease as the beam spreads out and the beam intensity decreases. The chart data shown were produced with a pulsed fiber laser operating at 1064 nm wavelength and 10 W of average power. The pulses were generated at a repetition rate of 120 kHz and had a pulse duration of around 1 ns. For other sets of parameters, marked widths 60 are similarly smaller than beam widths 58 in the marking area 74 of the mark zone 34, though the relative amount of difference between widths 58, 74 varies upon the laser system configuration and the parameters selected for the laser beam 18.

Together the ablation and marking thresholds 30, 32 hereinbefore described and the Gaussian beam shape depicted in perspective in FIG. 2 define a mark zone 34 having a shape of a frustum 76, or conic-section. The shape 76 has outer gradient surfaces 78 forming the bounds of the laser beam 18 and with top and bottom boundaries forming the respective ablation and marking thresholds 30, 32. The shape of frustum 76 defining mark zone 34 can vary depending on the beam parameters selected or achieved by the laser system 10 in relation to object 20. The portion of the frustum 76 that contributes significantly to the formation of marked area 62 is defined by the marking area 74, shown in FIG. 7. The shape of the marking area mark zone 74 may have a non-frustum shape and again depends on selected beam and laser system parameters.

It is thought that the present invention and many of the attendant advantages thereof will be understood from the foregoing description and it will be apparent that various changes may be made in the parts thereof without departing from the spirit and scope of the invention or sacrificing all of its material advantages, the forms hereinbefore described being merely exemplary embodiments thereof.

We claim:

1. An article of manufacture, comprising:
a non-oxidized substrate;
an anodized surface layer situated on the substrate and having an exterior surface;
an unmarked region of the substrate and an unmarked portion of the anodized surface layer situated on the unmarked region of the substrate that define an unmarked area, the exterior surface of the anodized surface layer in the unmarked area having a first surface roughness; and
a marked region of the substrate and a marked portion of the anodized surface layer situated on the marked region of the substrate that define a marked area, the exterior surface of the anodized surface layer in the marked area having a second surface roughness, wherein the first surface roughness is substantially the same as the second surface roughness;
wherein a darkness level of the marked area is produced by delivery of a pulsed laser beam to a sub-surface interface between the anodized surface layer and the substrate that is in a pulsed laser beam mark zone defined by an ablation threshold plane offset from a waist of the pulsed laser beam and a marking threshold plane offset from the waist of the pulsed laser beam, and that is scanned relative to the substrate so as to form the marked area; and
wherein the marked area comprises bumps and dimples.

2. The article of manufacture of claim 1, wherein the marked area has a LAB standard for color characterization darkness level that does not change by more than 20% across viewing angle.

3. The article of manufacture of claim 1, wherein a darkness level of the marked area has a LAB standard for color characterization value that is less than 30.

4. The article of manufacture of claim 1, wherein the substrate is aluminum.

5. The article of manufacture of claim 1, wherein the marked area includes a plurality of overlapping marked portions arranged in parallel path segments.

6. The article of manufacture of claim 5, wherein each of the overlapping marked portions is associated with a corresponding laser pulse delivered by a pulsed laser beam having a repetition rate between 10 kHz and 1000 kHz and an average power of not greater than 20 watts, and wherein laser pulses of the pulsed laser beam have pulse durations of less than 2.0 ns.

7. The article of manufacture of claim 5, wherein the distance between path segments is less than a separation distance above which ablation effects occur that remove the substantial similarity of the first and second surface roughnesses.

8. The article of manufacture of claim 7, wherein the separation distance is 20 µm or less.

9. The article of manufacture of claim 1, wherein a darkness level of the marked area has a LAB standard for color characterization value that is less than 40.

10. An article of manufacture, comprising:
an object including a marked area and unmarked area having substantially similar surface roughnesses, the marked area produced by:
directing a pulsed laser beam to the object so that a sub-surface interface between an oxidized surface layer and an underlying non-oxidized layer of the object is in a mark zone defined by an ablation threshold plane and a marking threshold plane, wherein a waist of the pulsed laser beam is situated outside of the mark zone,
scanning the laser beam and object relative to each other in a predetermined pattern so that the marked area is formed in the underlying non-oxidized layer and oxidized surface layer, and
wherein the marked area comprises bumps and dimples.

11. The article of manufacture of claim 10, wherein a repetition rate of the pulsed laser beam is between 10 and 1000 kHz and an average power is not greater than 20 watts, and the pulses of the pulsed laser beam have pulse durations that are less than about 2.0 ns.

12. The article of manufacture of claim 10, wherein the marked area includes a plurality of parallel laser mark path segments corresponding to the scanning of the laser beam in the predetermined pattern, each parallel laser mark path segment scan path overlapping an adjacent parallel laser mark path segment scan path so as to be spaced apart by less than a separation distance above which ablation effects occur that remove the substantial similarity of the surface roughnesses.

13. The article of manufacture of claim 12, wherein each laser mark segment including a plurality of laser marked pulse portions corresponding to respective laser pulses of the pulsed laser beam received along a segment scan path of the predetermined pattern such that the laser marked pulse portions overlap by at least 80%.

14. The article of manufacture of claim 13, wherein laser marked pulse portions overlap by at least 95%.

15. The article of manufacture of claim 13, wherein the width of each laser marked pulse portion is less than a width of the pulsed laser beam in the mark zone.

16. The article of manufacture of claim 10, wherein the marked area has a LAB standard for color characterization darkness level that does not change by more than 20% across viewing angle.

17. The article of manufacture of claim 12, wherein the distance between adjacent parallel laser mark path segments is 20 µm or less.

18. The article of manufacture of claim 10, wherein a darkness level of the marked portion has a LAB standard for color characterization value of less than 30.

19. A method, comprising:
directing a pulsed laser beam to an object such that a sub-surface interface between an oxidized surface layer of the object and an underlying non-oxidized layer of the object is in a mark zone of the pulsed laser beam defined by an ablation threshold plane and a marking threshold plane, wherein a waist of the pulsed laser beam is outside of the mark zone; and
scanning the laser beam and the object relative to each other so that a mark is formed in the oxidized surface layer and below the oxidized surface layer of the object in the underlying non-oxidized layer of the object.

* * * * *